US012373596B2

(12) United States Patent
Clark et al.

(10) Patent No.: US 12,373,596 B2
(45) Date of Patent: Jul. 29, 2025

(54) DATA RISK OF AN INSTANCE

(71) Applicant: ServiceNow, Inc., Santa Clara, CA (US)

(72) Inventors: Timothy John Clark, Carlsbad, CA (US); Michal Shalmoni, Livermore, CA (US)

(73) Assignee: ServiceNow, Inc., Santa Clara, CA (US)

( * ) Notice: Subject to any disclaimer, the term of this patent is extended or adjusted under 35 U.S.C. 154(b) by 352 days.

(21) Appl. No.: 17/403,634

(22) Filed: Aug. 16, 2021

(65) Prior Publication Data

US 2023/0046959 A1 Feb. 16, 2023

(51) Int. Cl.
*G06F 21/62* (2013.01)
*G06F 3/0482* (2013.01)
*G06F 21/57* (2013.01)

(52) U.S. Cl.
CPC ........ *G06F 21/6245* (2013.01); *G06F 3/0482* (2013.01); *G06F 21/577* (2013.01); *G06F 2221/2113* (2013.01); *G06F 2221/2141* (2013.01)

(58) Field of Classification Search
CPC .............. G06F 21/577; G06F 21/6245; G06F 2221/2113; G06F 2221/2141; G06F 2009/4557
See application file for complete search history.

(56) References Cited

U.S. PATENT DOCUMENTS

| | | | |
|---|---|---|---|
| 8,209,760 B1* | 6/2012 | Hardman | G06F 21/577 726/25 |
| 2015/0264084 A1* | 9/2015 | Kashyap | H04L 63/1483 726/22 |
| 2017/0091680 A1* | 3/2017 | Rosenthal | G06Q 10/0633 |
| 2018/0027006 A1* | 1/2018 | Zimmermann | H04L 63/0227 726/11 |
| 2019/0095626 A1* | 3/2019 | Mohan | G06F 21/577 |
| 2019/0272386 A1* | 9/2019 | Ley | G06F 21/6245 |
| 2020/0314145 A1* | 10/2020 | Bolignano | G06Q 10/103 |
| 2021/0264056 A1* | 8/2021 | Irish | G06F 21/6245 |
| 2022/0103597 A1* | 3/2022 | Gobena | H04L 63/0236 |
| 2023/0046959 A1* | 2/2023 | Clark | G06F 21/6218 |

* cited by examiner

*Primary Examiner* — Dao Q Ho
(74) *Attorney, Agent, or Firm* — MCDONNELL BOEHNEN HULBERT & BERGHOFF LLP

(57) ABSTRACT

Each instance environment of a plurality of computing instance environments is associated with its corresponding set of users belonging to one or more user groups, its corresponding processes, and its corresponding data access privileges. For at least one of the computing instance environments, database tables accessible by the corresponding computing instance environment are analyzed to determine whether each of the database tables includes data belonging to one or more sensitive data categories. Based at least in part on a result of the analysis determining whether each of the database tables includes data belonging to the one or more sensitive data categories, a data risk metric is determined for the corresponding computing instance environment.

19 Claims, 7 Drawing Sheets

Table Risk Configuration

*Table Name u_credential_ws_config

- The Table Contains Security/Infrastructure Information — NO
- The Table Contains PII (Personally Identifiable Information) — YES
- The Table Contains Financial Information — NO
- The Table Contains PCI (Payment Card Industry Information) — NO
- The Table Contains Proprietary data (IP) — NO
- The Table Contains PHI (Protected Health Information) — NO
- The Table Contains Customer Restricted — NO Submit

FIG. 7

DATA RISK OF AN INSTANCE

BACKGROUND OF THE INVENTION

Computing instance environments are often utilized to support web services such as web applications. Typically, each computing instance environment is capable of running multiple web applications and their associated processes. A computing instance environment can be configured with multiple tiers, such as a data tier accessible to applications for storing information such as customer data, employee data, application specific data, etc. The data tier can store the information as records in database tables. When accessed by web applications, the retrieved data can be processed, for example, by business logic, and presented to an end user for display. Data can also be received from users of web applications or pulled from external sources and stored in the data tier of the computing instance environment.

BRIEF DESCRIPTION OF THE DRAWINGS

Various embodiments of the invention are disclosed in the following detailed description and the accompanying drawings.

FIG. 7 is a diagram illustrating an embodiment of a user interface for configuring the analysis of data risk metrics for a computing instance.

DETAILED DESCRIPTION

Figure 1:
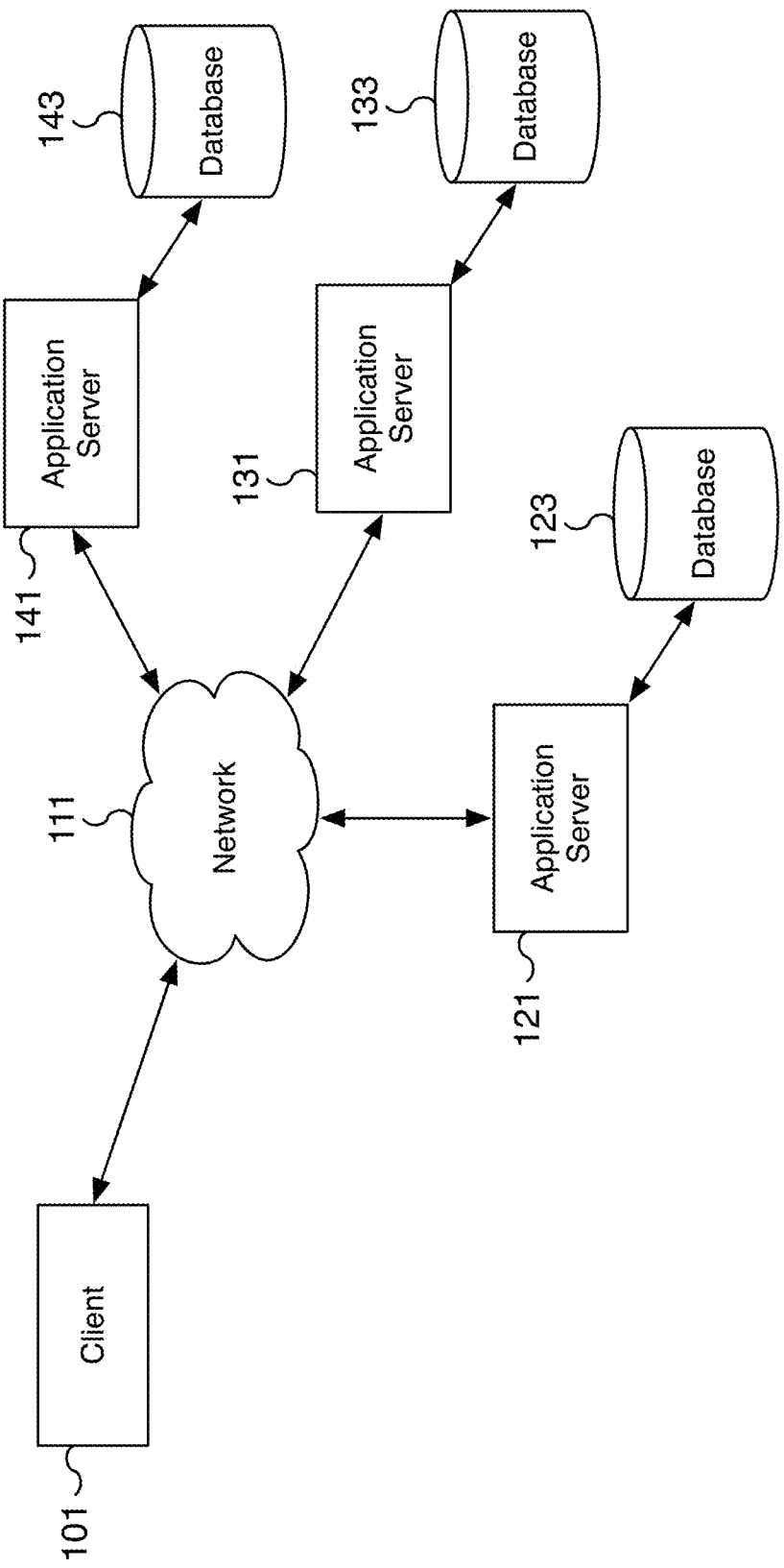
FIG. 1 is a block diagram illustrating an example of a network environment for performing data risk analysis for a computing instance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data risk analysis for computing instance environments is disclosed. Using the disclosed techniques, a computing instance environment can be evaluated for the relative risk associated with the data stored on the instance environment. For example, the data stores configured with each computing instance environment can be evaluated to identify data belonging to sensitive data categories. The identified sensitive data is then evaluated to determine the access privileges, such as the ability to read, write, and/or delete the identified sensitive data, that have been granted. Examples of sensitive data categories include personally identifiable information, financial information, payment information, health information, or another defined category of sensitive information. In various embodiments, the disclosed techniques are flexible and can be utilized to quantify the risk associated with data belonging to a variety of different data categories. Based on the analysis of the sensitive data and associated accessibility of the data, an associated risk metric can be determined. The risk metric can be evaluated at multiple levels of granularity, such as at the table level, user level, group level, or computing instance environment level. In various embodiments, the determined risk level is used to trigger follow-on actions such as security notifications and/or workflows. For example, access to a database table identified as high risk or with a determined risk metric that exceeds a configured threshold value can trigger the blocking of any unsecure table actions (such as duplicating the table) while also notifying a system administrator. As another example, an evaluated risk metric can be used to identify all users, roles, and groups that have access to identified sensitive data.

In some embodiments, a plurality of computing instance environments is provided. For example, a customer operates multiple computing instance environments, each configured for providing multiple and possibly different web services. Each instance environment of the computing instance environments is associated with its corresponding set of users belonging to one or more user groups, its corresponding processes, and its corresponding data access privileges. For example, each computing instance environment can be configured differently. A first computing instance environment may have a first set of users that do or do not share users from a second computing instance environment. Similarly, the first computing instance environment can be configured to run human resources services, customer service management services, and related processes whereas the second computing instance environment can be configured to run information technology management services, information technology operations services, security operations services, and related processes. Each computing instance environment is also configured with different data access privileges. The users of each computing instance environment can be configured and assigned to one or more different user groups. The disclosed risk analysis techniques can be performed on each computing instance environment independently to quantify the risk associated with each instance environment.

In some embodiments, for at least one of the computing instance environments, database tables accessible by the corresponding computing instance environment are analyzed to determine whether each of the database tables includes data belonging to one or more sensitive data categories. For example, a category specific scanner can be used to identify which tables of a computing instance environment include data, fields, and/or columns with the identified sensitive data. In the event there are multiple categories of sensitive data, the process identifies tables with data for each configured category of sensitive data. For the at least one of the computing instance environments, a data risk metric is determined for the corresponding computing instance environment based at least in part on a result of the analysis determining whether each of the database tables accessible by the corresponding computing instance environment includes data belonging to the one or more sensitive data categories. For example, an identified table with sensitive data is analyzed to determine the operations that can be performed on it. Example access operations may include a create data access operation, a read data access operation, an update data access operation, and a delete data access operation, among others. A risk metric for the table can be determined based on the number and type of users and/or database roles with the identified access privileges to the identified sensitive data. A corresponding risk metric can also be determined for the entire computing instance environment based on the determined risk metrics of individual tables.

Using the disclosed techniques, the overall system security of a computing instance is significantly improved. For example, triggers such as security and/or administration workflows can be configured when determined risk metrics exceed configured threshold values. As an example workflow configuration, triggers can be configured to identify and prevent exposure to sensitive data when a read operation is performed on a table with a risk metric that exceeds a configured threshold. The quantified risk metrics are also beneficial for managing computing instance environments. For example, an administrator can automatically identify which roles and groups have a risk metric that exceeds a configured "high risk" value. Using the provided list of "high risk" roles and groups, an administrator can determine what roles and groups to assign different computing instance environment users.

FIG. 1 is a block diagram illustrating an example of a network environment for performing data risk analysis for a computing instance. In the example shown, client 101 accesses a data risk analysis service that provides risk analysis of computing instances. The data risk analysis service can be hosted on and provided by one or more of application servers 121, 131, and 141 and can further analyze the data risk associated with one or more of application servers 121, 131, and 141. For example, client 101 can access a data risk analysis service of application server 121 to view and manage data risk analysis results of application servers 121, 131, and/or 141. As shown in the example, each application server is communicatively connected to a data store. For example, application servers 121, 131, and 141 utilize databases 123, 133, and 143, respectively. In various embodiments, at least an application server and its associated data store make up a functional computing instance. For example, application server 121 and database 123 are a computing instance for which an analysis of data risk can be performed. Similarly, application server 131 and database 133 are a separate computing instance and application server 141 and database 143 are another computing instance. In various embodiments, client 101 and application servers 121, 131, and 141 are each connected via network 111. Network 111 can be a public or private network. In some embodiments, network 111 is a public network such as the Internet.

In some embodiments, client 101 is an example client system used to connect to a data risk analysis service offered by one or more of application servers 121, 131, and/or 141. Client 101 can be a laptop, desktop computer, mobile device, tablet, or another appropriate computing device. In some embodiments, the client 101 connects to the data risk service via a web browser or client application. In various embodiments, client 101 can configure the data risk analysis service as well as manage and view data risk results. The risk analysis service can provide continuously updated results as the risk to the underlying data changes over time. Using client 101, an operator can view the current and historical risk analysis results as well as manage data risk management actions based on evaluated risk. For example, an operator can view which users and groups have access to sensitive data and the type of access they are granted along with one or more data risk metrics for a computing instance. As another example, an operator can configure a notification to alert administrators in the event a delete operation is requested to be performed on a portion of sensitive data with at least a specified data risk metric.

In some embodiments, application servers 121, 131, and 141 utilize databases 123, 133, and 143, respectively as data sources. For example, each of application servers 121, 131, and 141 along with their respective data stores, databases 123, 133, and 143, are a computing instance. Each computing instance can host one or more application services such as a human resources service, a customer service management service, an information technology management service, an information technology operations service, and a security operations service, among other services and related processes. In some embodiments, one or more of the application services are configuration management database (CMDB) services. The different services access data from their respective data stores as part of providing a corresponding cloud-based service. In some embodiments, the application servers are configured with different access roles for accessing data, such as create, read, update, and delete access. Along with the roles, an application server can be configured with different groups. Each group can be configured to include one or more roles. For example, a first group can include create, read, and delete access roles for a particular database table and a second group can include read and update access roles for the same database table along with a read access role for a second database table. By combining one or more roles into a single group, an operator can define a group of permissions for accessing data. In various embodiments, once the groups are configured using the appropriate roles, different users of an application server can be assigned to belong to the defined groups. For example, a travel expense approvers group can include all manager user accounts.

In various embodiments, the data in the various data stores of an application server, such as databases 123, 133, and 143, can include sensitive data as defined by a sensitive data category. Example categories include personally identifiable information (PII), protected health information (PHI), and credit card or payment industry information (PCI), among others. Depending on the applicable sensitive data categories, data can belong to none, one, or multiple sensitive data categories. In some embodiments, the data, such as database tables, fields, rows, or other database table attributes including names, are identified as belonging to one or more sensitive data categories by running one or more data category scanners. For example, a PII data scanner can detect personally identifiable information and a PHI data scanner can detect protected health information. In some embodiments, the scanners are implemented as services hosted by one or more of application servers 121, 131, and 141. The scanning service can also be implemented by a third-party scanning service (not shown) or by a locally installed and executed scanning application running on an application server. The scanning service can be further configured to run routinely, for example, as a scheduled service, to frequently update the identification of sensitive data and corresponding categories. In some embodiments, once sensitive data is identified, the classified data is presented to an operator via a data risk analysis service, such as an operator accessing a cloud-based data risk service via client 101. Using the data risk analysis service, the operator can confirm or reject the classification of the identified data as sensitive data. For example, an operator can override results for data identified as sensitive data by a scanner and provide a justification for why the data should be classified as not sensitive data. In various embodiments, the confirmed sensitive data is evaluated using configured access weights for determining a data risk metric for a computing instance.

In various embodiments, databases 123, 133, and 143 are data sources for their respective application servers 121, 131, and 141. For example, the databases 123, 133, and 143 can be configuration management databases (CMDB) used by their respective application servers for providing CMDB services. In some embodiments, databases 123, 133, and 143 are utilized by their respective application servers to store and retrieve information, such as customer or client information. For example, each of the databases 123, 133, and 143 can be used to store resource discovery information of different clients to offer the different clients a cloud-based service for managing their respective resources and assets. Although the databases 123, 133, and 143 are shown connected to their respective application servers 121, 131, and 141, each of databases 123, 133, and 143 may be located in a variety of network locations as appropriate. For example, database 123 may be located external to a local network that includes application server 121. In some embodiments, databases 123, 133, and 143 may not be directly connected to their respective application servers 121, 131, and 141 but only communicatively connected. In some embodiments, database 123, 133, and/or 143 are cloud-based database servers and may be part of and/or collocated with their respective application servers 121, 131, and 141.

Although single instances of some components have been shown to simplify the diagram of FIG. 1, additional instances of any of the components shown in FIG. 1 may also exist. For example, application servers 121, 131, and/or 141 may include one or more different servers and/or multiple distributed components. Similarly, database 123, 133, and/or 143 may include one or more database servers and may not be directly connected to their respective application servers 121, 131, and 141. For example, database 123 and its components may be replicated and/or distributed across multiple servers, components, and/or locations. In some embodiments, the application servers for data category scanning and/or data risk analysis are separate or different from the servers for hosting cloud-based services such as CMDB services. As another example, client 101 is just a single example of a potential client for accessing application servers 121, 131, and 141 and additional clients can exist that are used to connect to the different application servers. In some embodiments, components not shown in FIG. 1 may also exist.

Figure 2:
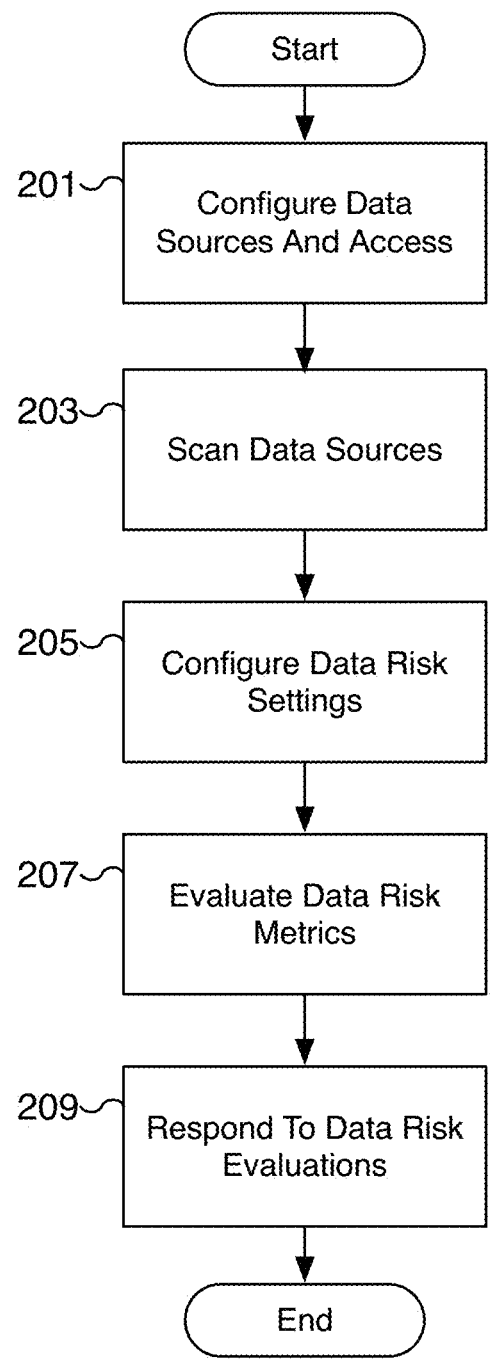
FIG. 2 is a flow chart illustrating an embodiment of a process for performing data risk analysis for a computing instance.

FIG. 2 is a flow chart illustrating an embodiment of a process for performing data risk analysis for a computing instance. Using the process of FIG. 2, a computing instance including an application server and its associated data sources can be analyzed to determine the data risk associated with the computing instance. As the computing instance and associated data sources change over time, for example, users, groups, and roles change and as the type and amount of data accessible changes, the data risk analysis will also be updated. In some embodiments, an operator can access the data risk analysis results via a cloud-based data risk analysis service. In some embodiments, the data risk analysis service is hosted by an application server such as one of application servers 121, 131, or 141 of FIG. 1 and the data risk analysis is performed on a computing instance that includes an application server such as one of application servers 121, 131, or 141 of FIG. 1. In various embodiments, the data risk analysis service is accessible from a client such as client 101 of FIG. 1.

At 201, data sources and access are configured. For example, a data source such as a database is configured and populated with data. The data source and any corresponding application servers are further configured with accounts for accessing and managing the configured data and data source. The data source configuration can include creating one or more database tables with different access permissions including read and write permissions as well as create, update, and/or delete permissions. In some embodiments, a role is created for each allowable permission, such as a different role for creating a new entry in a table, for reading an entry from a table, for updating an entry in a table, and for deleting an entry from a table. Other permission structures can be applicable as well such as permissions for renaming a table or field names. In some embodiments, groups and users are created based on the configured roles. A group can be created that includes one or more roles and allows users included in the group to perform any of the actions associated with the included roles of the group. For example, an administrators group can include roles corresponding to all available permissions whereas a more restrictive group may only include roles corresponding to write and read permissions. In various embodiments, associated application servers are configured with the appropriate accounts to allow access to the applicable data sources. Although a role, group, and user permission hierarchy is described, other permission hierarchies or structures are applicable as well. For example, a permission structure relying only on user accounts, where users are directly assigned different access permissions for the data source, is applicable as well.

At 203, data sources are scanned. By scanning the data sources, including scanning database tables, fields, rows, or other database table attributes including table and field names, for their association with different categories, data accessible by a computing instance is analyzed to determine whether the data belongs to a sensitive data category. For example, one or more data category scanners are invoked to scan the data sources configured at 201. Each data category scanner can detect one or more associated data categories including sensitive data categories. For example, a PII data scanner can detect personally identifiable information and a PHI data scanner can detect protected health information. Depending on the applicable categories, different data category scanners can be invoked. In various embodiments, the scanners can be scheduled to run routinely and will detect changes to the data stored on the configured data sources. In some embodiments, the data scanning includes a validation step to filter out false positives. For example, a validation step can include additional passes through the data to refine the results of an initial data scan.

At 205, data risk settings are configured. In various embodiments, data risk settings are configured for analyzing the data risk associated with a computing instance as well as how to respond to the identification of behaviors or actions relative to a risk metric. For example, in some embodiments, a data risk access weight can be configured for each different type of access permission. In various embodiments, access permissions can correspond to access control list configuration settings. Access permissions that are not exposed can correspond to lower or zero weighted data risk access weights and access permissions that are exposed can correspond to higher weighted data risk access weights. In some embodiments, data risk access weights include a create data risk access weight, a read data risk access weight, an update data risk access weight, and a delete data risk access weight, among others. This allows delete access operations to be configured with a higher risk weight than read access operations. Similarly, different data categories can be configured with different weights. The weights associated with personally identifiable information can be different than the weights associated with protected health information. Moreover, the weights can be different depending on the actual data source. For example, the data risk access weights applicable for personally identifiable information compared to credit card or payment industry information can be configured differently depending on context, such as the associated database table. In some embodiments, for each database table, a different set of data risk access weights are configured for each access privilege type and monitored data category.

In some embodiments, data risk settings can be configured to trigger actions in the event actions or behaviors are detected based on an analyzed data risk metric. For example, a read operation can trigger sending a notification to an administrator when a read operation is detected for data with an analyzed data read risk metric that exceeds a configured read metric threshold. As another example, a delete operation can trigger a requirement for administrator approval before the delete operation can be performed by configuring a trigger that alerts an administrator and blocks the operation pending administrator approval when a delete operation is detected for data with an analyzed delete risk metric that exceeds a configured delete metric threshold. In various embodiments, the analyzed data metrics can be used to configure actionable behaviors including triggers, notifications, and blocking access to data operations.

In various embodiments, as part of configuring the data risk settings, an operator can remove data from being evaluated as sensitive data. For example, an operator can identify certain identified data, such as database tables or fields, to remove their classification as sensitive data. In some embodiments, a field classified as not sensitive requires the operator to provide an explanation. The explanation can be logged and can be helpful when performing an audit of the data risk.

At 207, data risk metrics are evaluated. For example, the data accessible from a computing instance is analyzed and one or more data risk metrics are determined. In some embodiments, the data risk is determined at multiple levels of granularity. For example, a data risk metric can be determined for each sensitive data category, for each database table, and/or for each access privilege type. In some embodiments, data of a specific table may have different analyzed risk metrics for creating, reading, updating, and deleting the data with respect to one category (such as personally identifiable information) and different analyzed risk metrics for creating, reading, updating, and deleting the data with respect to a different category (such as protected health information). In various embodiments, a unified data risk metric is evaluated that takes into account the overall different categories and access privileges. For example, a data risk metric can be determined for a computing instance based on the different data sources accessible via the instance, the sensitive data categories the data belongs to, and the configured data risk access weights. In some embodiments, a single data risk metric can be determined for a computing instance that can be used to evaluate the data risk of the computing instance.

In some embodiments, the evaluated data risk metrics include a determination of specifics related to access points to different data from a computing instance. For example, the users, groups, and roles with access to sensitive data and the type of sensitive data can be determined and provided to an operator. Using a data risk analysis service, an operator can navigate, explore, drill down, and otherwise manage, the different access points from which sensitive data can be accessed from a computing instance. For example, an operator can view the number of users of a computing instance that have write access to personally identifiable information and further drill down to the actual users and their accounts as well as which database tables, fields, and entries contain the personally identifiable information data accessible by the specified users.

At 209, data risk evaluations are responded to. For example, actions based on results of the data risk settings configured at 205 and the data risk metrics evaluated at 207 are responded to. In some embodiments, the responses can include triggers, notifications, and/or modifying access to data operations, among others. For example, the responses can include invoking programmable scripts or other services based on a data access operation and an associated data risk metric. As one example, an action can be invoked based on the detection of a data access operation, such as a read access operation, with respect to the data risk metric of the targeted data such as the data risk metric exceeding a configured read data risk threshold. The actionable response can be a notification to an administrator when a read operation is performed on data with a data risk metric that exceeds a high read risk threshold. Read operations for data with a data risk metric below the high read risk threshold would progress normally without the triggered notification.

Figure 3:
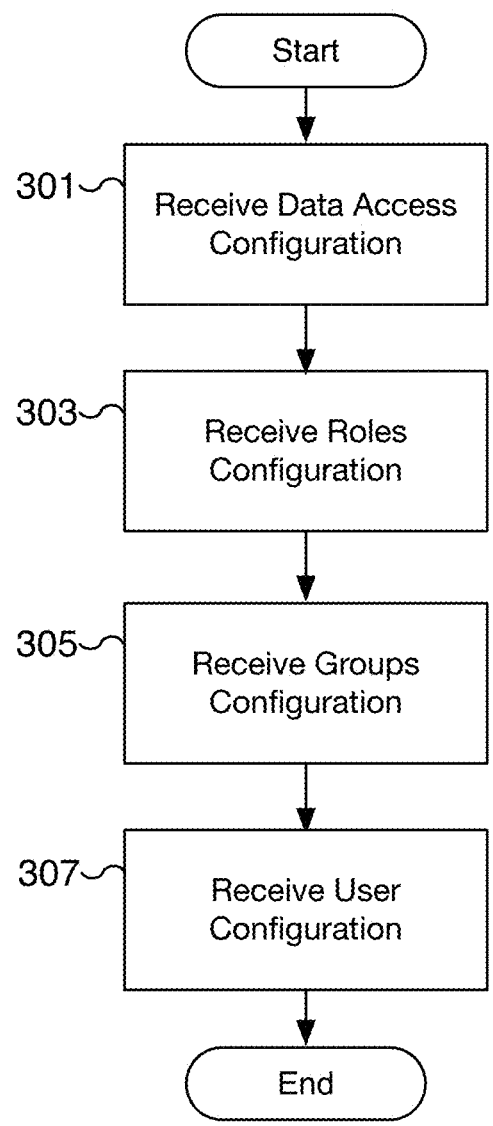
FIG. 3 is a flow chart illustrating an embodiment of a process for configuring access to data sources for a computing instance.

FIG. 3 is a flow chart illustrating an embodiment of a process for configuring access to data sources for a computing instance. In some embodiments, the process of FIG. 3 is performed by an application server such as one of application servers 121, 131, or 141 of FIG. 1. Using the process of FIG. 3, an operator can configure for a computing instance access to data including sensitive data. In some embodiments, the operator configures the access via a cloud-based data risk analysis service. The data risk analysis service can be hosted by an application server such as one of application servers 121, 131, or 141 of FIG. 1 and the data risk analysis is performed on a computing instance that includes an application server such as one of application servers 121, 131, or 141 of FIG. 1. In various embodiments, the data risk analysis service is accessible from a client such as client 101 of FIG. 1. In some embodiments, the process of FIG. 3 is performed at 201 of FIG. 2.

At 301, a data access configuration is received. For example, the data sources and their associated access configurations from a specific application server are received. The data access can include access to databases such as one or more of databases 123, 133, and 143 of FIG. 1. In some embodiments, the data access configuration specifies the access properties available for each data source such as create, read, update, and delete access to each database.

At 303, the configuration of data access roles is received. For example, the configuration of one or more roles created where each role is defined by one or more forms of access to a data source is received. In some embodiments, each type of access to a particular database table, such as create, read, update, and delete access, is associated with a different role. At 303, the different available roles configured for the data source are received. In some embodiments, some roles may exist but may never be utilized. For example, on creation of a database table, different roles are created by default for the different available forms of access whether or not they are eventually utilized by an application server.

At 305, the configuration of data access groups is received. For example, the configuration of one or more groups created that specify access privileges to data sources is received. In some embodiments, a group can be defined by a collection of roles. For example, a group can be configured to include a create access role, read access role, and update access role for a particular database table. In various embodiments, a group can also include roles associated with different data sources.

At 307, the configuration of data access users is received. For example, the configuration of one or more users created that belong to one or more groups is received. In some embodiments, a user can belong to any number of the groups, whose group configuration was received at 305. By belonging to a group, a user is granted the roles of the group. For example, users belonging to a health_records_administrators group have the access to data sources based on the roles assigned to the health_records_administrators group. In various embodiments, a role, group, and user permission hierarchy is described by the relationships between the configurations received at 301, 303, 305, and 307.

Figure 4:
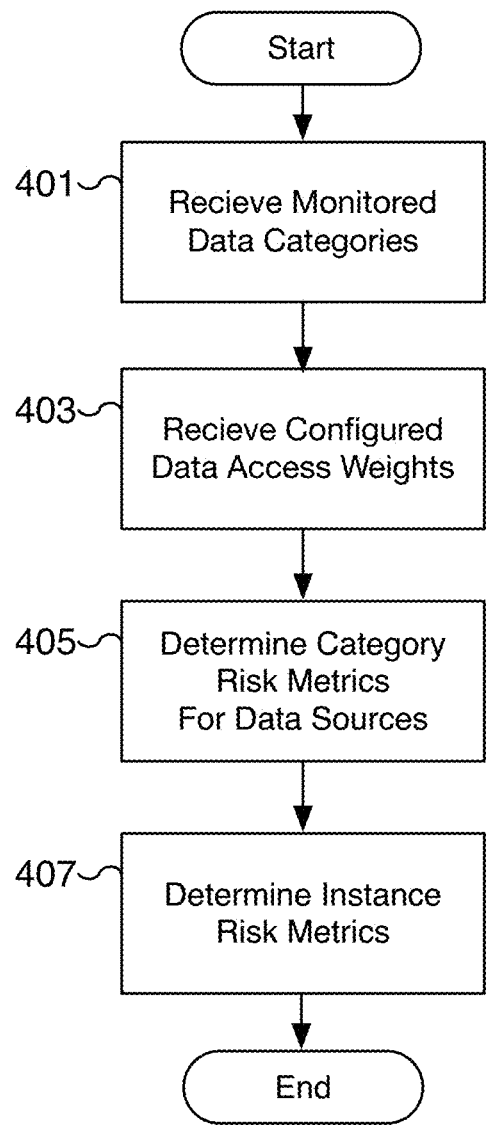
FIG. 4 is a flow chart illustrating an embodiment of a process for evaluating data risk metrics associated with a computing instance.

FIG. 4 is a flow chart illustrating an embodiment of a process for evaluating data risk metrics associated with a computing instance. In some embodiments, the process of FIG. 4 is performed as part of a data risk analysis service hosted by an application server such as one of application servers 121, 131, or 141 of FIG. 1. Using the process of FIG. 4, the data risk metrics are evaluated for a computing instance that includes an application server such as one of application servers 121, 131, or 141 of FIG. 1. In some embodiments, the process of FIG. 4 is performed at 207 of FIG. 2.

At 401, monitored data categories are received. For example, the data categories configured for monitoring and analysis by a data risk analysis service are received. Monitored categories can correspond to the sensitive data categories relevant for a particular computing instance. For example, a computing instance dedicated to Human Resources can be configured to monitor personally identifiable information but not payment information. Example data categories can include but are not limited to personally identifiable information, financial information, payment information, health information, or another defined category of sensitive information.

At 403, configured data access weights are received. For example, the data access weights for each database table are received. In some embodiments, the weights are configured for each data access type, such as a different data access weight for create, read, update, and delete access modes. For example, the configured data risk access weights received can include a create data risk access weight, a read data risk access weight, an update data risk access weight, and a delete data risk access weight. In addition, in some embodiments, different data access weights can be further configured depending on the monitored data category. For example, the data access weight for read access to personally identifiable information can be different than the data access weight for read access to financial information for data in the same database table. At 403, the configured weights are received for data sources with monitored data categories accessible from the computing instance. The weights may be received from a database for storing configuration settings for the data risk analysis service.

At 405, category risk metrics for data sources are determined. Using the weights received at 403, the data sources corresponding to the monitored data categories received at 401 are evaluated to determine category risk metrics. For example, the data access weights, such as a create, read, update, and delete weight, for each data category are applied to determine category risk metrics. In various embodiments, depending on the number of monitored data categories, multiple category risk metrics can be determined for a data source such as a database table. For example, category risk metrics can be determined for each monitored data category.

In some embodiments, the data access weights are evaluated by applying the appropriate data access weight for each access mode that is enabled. For example, a read data access weight is only applicable in the event read access is enabled for the specific database table. Similarly, create, update, and delete data access weights are only applicable in the event the respective create, update, and delete access mode is enabled for the specific database table. The application of the data access weights can be applied by data category and can use category specific data access weights. For example, the data access weights are applied for a personally identifiable information data category separate from financial information, health information, or other sensitive data categories. For each monitored category, a category risk metric is determined. In some embodiments, the risk metric for a category is determined by summing together the corresponding configured data access weights for each enabled data access mode. For example, for a health information category, the corresponding data risk metric is the sum of the weights for each enabled data access mode. As an example, in the event only create and read access modes are enabled for a database table, only the corresponding data access weights for create and read access are summed together to determine the health information category risk metric.

In some embodiments, the data risk metric is determined based also on the number of users, groups, and/or roles that have been granted the corresponding access mode. For example, a data source with more users with access privileges is evaluated as having a higher data risk metric than a data source with fewer users with the same access privileges given the same configured data access weights. In various embodiments, the number of users, groups, and/or roles can function as a scaling factor to the data access weights for determining category data risk metrics.

At 407, computing instance risk metrics are determined. Using the determined category risk metrics determined at 405, one or more computing instance risk metrics are determined. For example, risk metrics for each monitored category can be determined based on the accessible data sources from the computing instance that belong to each monitored category. As one example, the determined health information category risk metric for each database table accessible from the computing instance is summed together to determine a health information category risk metric for the computing instance. Similarly, the determined personally identifiable information data category risk metric for each database table accessible from the computing instance is summed together to determine a personally identifiable information data category risk metric for the computing instance. In some embodiments, the different category risk metrics are used to determine a single risk metric for the computing instance. For example, each determined category risk metric of the computing instance can be summed together to determine a single data risk metric of the computing instance.

Figure 5:
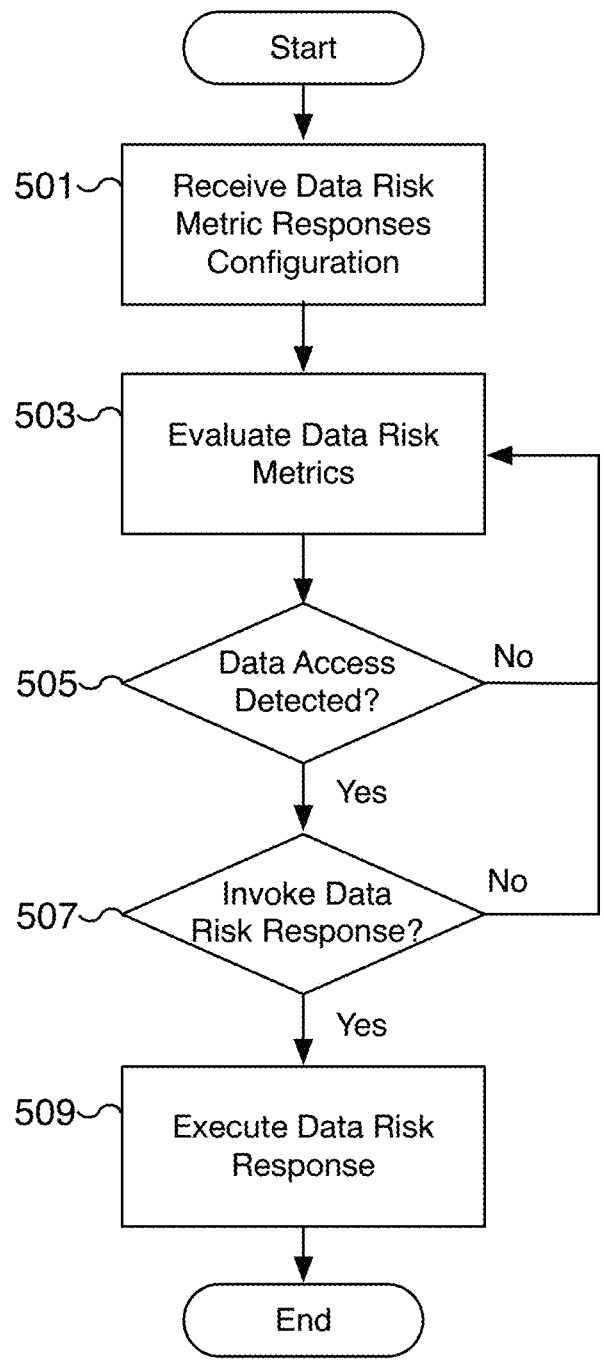
FIG. 5 is a flow chart illustrating an embodiment of a process for performing a configured response action for a computing instance based on data risk metrics.

FIG. 5 is a flow chart illustrating an embodiment of a process for performing a configured response action for a computing instance based on data risk metrics. In some embodiments, the process of FIG. 5 is performed as part of a data risk analysis service hosted by an application server such as one of application servers 121, 131, or 141 of FIG. 1. Using the process of FIG. 5, the data risk metrics are evaluated for a computing instance and can be used to invoke actionable responses such as triggers, notifications, alerts, and modifying access to data operations, among other responses. In some embodiments, the computing instance monitored for data risk includes an application server such as one of application servers 121, 131, or 141 of FIG. 1 based on access to data sources such as database 123, 133, and/or 143 of FIG. 1. In some embodiments, the process of FIG. 5 is performed at 205, 207, and/or 209 of FIG. 2. For example, the actionable response is configured at 205 of FIG. 2 based on one or more data risk metrics, the data risk metrics for the computing instance are evaluated at 207 of FIG. 2, and the actionable responses are triggered and invoked at 209 of FIG. 2.

At 501, the configuration of data risk metric responses is received. For example, the configuration of one or more actionable responses that should be invoked based on one or more data risk metrics is received. In some embodiments, the response is based on an attempted data access operation, such as an attempted create, read, update, and/or delete access operation to a monitored data source with data belonging to a sensitive data category. The configured response can include a configured threshold value for triggering the response. For example, a response can be configured to trigger only in the event the data accessed has a corresponding access data risk metric that exceeds a configured threshold value.

At 503, data risk metrics are evaluated. For example, data accessible from a computing instance is continuously analyzed and one or more data risk metrics are determined. In some embodiments, the data risk is determined at multiple levels of granularity. For example, a data risk metric can be determined for each sensitive data category, for each database table, and/or for each access privilege type. In various embodiments, the data risk metrics are determined based on the process described with respect to step 207 of FIG. 2 and/or the process of FIG. 4. For example, a data risk metric can be determined for a computing instance based on the different data sources accessible via the instance, the sensitive data categories the data belongs to, and the configured data risk access weights. In some embodiments, a single data risk metric can be determined for a computing instance that can be used to evaluate the data risk of the computing instance and trigger configured responsive actions.

At 505, a determination is made whether data access is detected. In the event data access is detected, such as a request to perform a create, read, update, or delete operation, processing proceeds to 507. In the event data access is not detected, processing proceeds back to 503 where the data risk metrics are reevaluated.

At 507, a determination is made whether to invoke a configured data risk response. In the event the conditions are met to invoke a data risk response, processing proceeds to 509. For example, a condition to invoke an actionable response can be based on the data access detected at 505 for a data source with a data risk metric evaluated at 503 that exceeds a configured data risk metric threshold. By exceeding the configured data risk metric threshold, the condition for invoking the actionable response to the data risk metric has been met. In the event the conditions are not met to invoke a data risk response, processing proceeds back to 503 where the data risk metrics are reevaluated.

At 509, a data risk response is executed. For example, the actionable response with a trigger condition met at 505 and 507 is invoked. The response can be a workflow that includes notifications, alerts, and/or modifying access to data operations, among other actions. For example, the responses can include invoking programmable scripts or other services based on a data access operation detected at 505 and an associated data risk metric condition met at 507. In various embodiments, the invoked response is described with respect to step 209 of FIG. 2. As one example, an actionable response can be invoked based on the detection of a data access operation, such as a read operation, with respect to the data risk metric of the targeted data such as the data risk metric exceeding a configured read data risk threshold. The actionable response can be a notification to an administrator when a read operation is performed on data with a data risk metric that exceeds a high read risk threshold.

Figure 6:
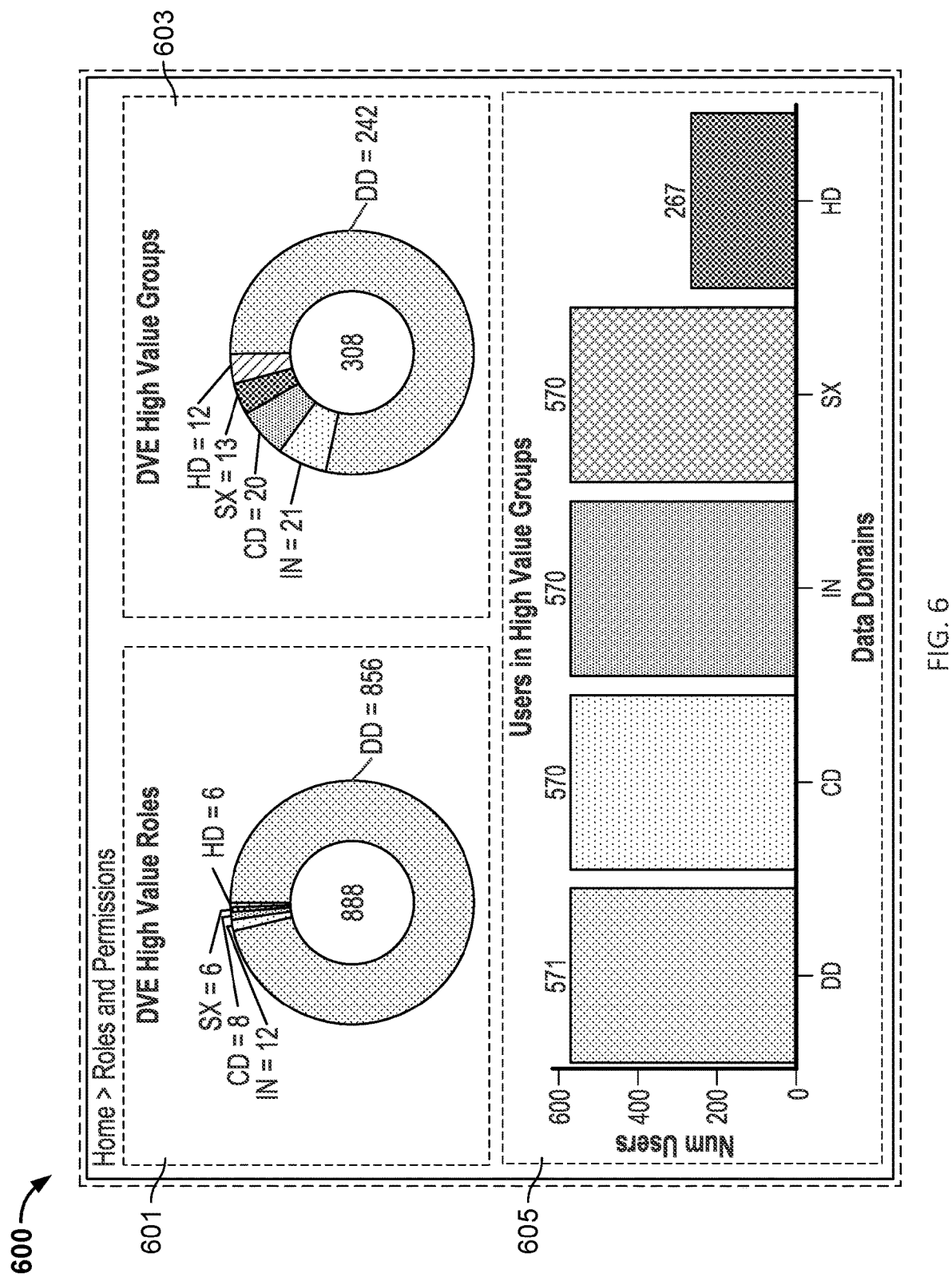
FIG. 6 is a diagram illustrating an embodiment of a user interface for viewing data risk metrics for a computing instance.

FIG. 6 is a diagram illustrating an embodiment of a user interface for viewing data risk metrics for a computing instance. In the example shown, user interface 600 is part of a user interface for a data risk analysis service hosted by an application server such as one of application servers 121, 131, or 141 of FIG. 1. The user interface is accessible by an operator of a client such as client 101 of FIG. 1 using a client application such as a web browser or another client application to the data risk analysis service. In some embodiments, the user interface of FIG. 6 displays the results of data risk metrics evaluated using the processes of FIGS. 2-4. For example, in some embodiments, user interface 600 is generated using data risk metrics evaluated at 207 of FIG. 2 for a computing instance. In some embodiments, the computing instance evaluated for data risk includes an application server such as one of application servers 121, 131, or 141 of FIG. 1 based on access to data sources such as database 123, 133, and/or 143 of FIG. 1.

In the example shown, user interface 600 includes roles data risk metric user interface element 601, groups data risk metric user interface element 603, and users data risk metric user interface element 605. The different user elements (roles data risk metric user interface element 601, groups data risk metric user interface element 603, and users data risk metric user interface element 605) display evaluated data risk metrics, specifically, a Data Value Estimate (DVE) risk metric. In various embodiments, the DVE risk metric shown in user interface 600 can be based on the total count of roles, groups, or users with access to data belonging to a particular sensitive data category.

In the example shown, roles data risk metric user interface element 601 of user interface 600 displays the configured roles of the computing instance that have access to sensitive data. The displayed DVE risk metric in the example is based on a total count. For example, roles data risk metric user interface element 601 displays the number 888 in the center of its pie chart, which corresponds to 888 roles with access to data belonging to sensitive data categories. The pie chart breaks down the categories using two letter abbreviations (i.e., IN, CD, SX, HD, and DD) for the different data categories and corresponding role counts. In the example shown, there are 856 roles with access to DD categorized data, 12 roles with access to IN categorized data, 8 roles with access to CD categorized data, 6 roles with access to SX categorized data, and 6 roles with access to HD categorized data.

In the example shown, groups data risk metric user interface element 603 of user interface 600 displays the configured groups of the computing instance that have access to sensitive data. A configured group can include one or more roles, where the roles can correspond to the roles shown in roles data risk metric user interface element 601. The displayed DVE risk metric in the example is based on a total count of groups with access to data belonging to sensitive data categories. For example, groups data risk metric user interface element 603 displays the number 308 in the center of its pie chart, which corresponds to 308 groups with access to data belonging to sensitive data categories. The pie chart breaks down the categories using two letter abbreviations similar to roles data risk metric user interface element 601 for the different data categories and corresponding group counts. In the example shown, there are 242 groups with access to DD categorized data, 21 groups with access to IN categorized data, 20 groups with access to CD categorized data, 13 groups with access to SX categorized data, and 12 groups with access to HD categorized data.

In the example shown, users data risk metric user interface element 605 of user interface 600 displays the configured users of the computing instance that have access to sensitive data based on their group affiliations. A configured user can be included in one or more groups, where the groups can correspond to the groups shown in groups data risk metric user interface element 603. The displayed DVE risk metric in the example is based on a total count of users with access to data belonging to sensitive data categories. For example, users data risk metric user interface element 605 displays the number of users with access to data belonging to different sensitive data categories labeled using two letter abbreviations similar to roles data risk metric user interface element 601 and groups data risk metric user interface element 603. In the example shown, there are 571 users with access to DD categorized data, 570 users with access to CD categorized data, 570 users with access to IN categorized data, 570 users with access to SX categorized data, and 267 users with access to HD categorized data.

In various embodiments, user interface 600 is an interactive user interface. For example, an operator can interact with user interface element components from roles data risk metric user interface element 601, groups data risk metric user interface element 603, and users data risk metric user interface element 605 to reveal additional detailed information related to the evaluated data risk analysis. For example, an operator can select the DD bar element of users data risk metric user interface element 605 to display the specific users with access to DD categorized data and the particular data sources they have access to that belong to the DD category, among other information. As another example, an operator can select the IN slice of groups data risk metric user interface element 603 to reveal details of the 21 groups that have access to IN categorized data including information on what roles belong to each of the 21 IN groups.

FIG. 7 is a diagram illustrating an embodiment of a user interface for configuring the analysis of data risk metrics for a computing instance. In the example shown, user interface 700 is part of a user interface for a data risk analysis service hosted by an application server such as one of application servers 121, 131, or 141 of FIG. 1. The user interface is accessible by an operator of a client such as client 101 of FIG. 1 using a client application such as a web browser or another client application to the data risk analysis service. In some embodiments, the user interface of FIG. 7 displays one screen of a configuration user interface for enabling or disabling the analysis of different categories of sensitive data as part of a process for evaluating the data risk of a computing instance. The computing instance evaluated for data risk includes an application server such as one of application servers 121, 131, or 141 of FIG. 1 based on access to data sources such as database 123, 133, and/or 143 of FIG. 1. In some embodiments, the identified categories shown in user interface 700 are based on the results of one or more data scanners, such as the results of data scanning performed at 203 of FIG. 2. In some embodiments, the configuration corresponding to the displayed settings of user interface 700 is part of the configuration performed at 205 of FIG. 2 for a particular database table accessible by the computing instance.

In the example shown, user interface 700 displays the table risk configuration for a selected database table shown in table name selection box 701. Table name selection box 701 shows the selected database table u_credential_ws_config. Using the drop-down action of table name selection box 701, an operator can select a different database table and show the corresponding table risk configuration of the newly selected table. With respect to the currently selected database table, the table risk configuration settings of database table u_credential_ws_config are shown in table risk configuration user interface element 703. As shown in the example, table risk configuration user interface element 703 displays seven different sensitive data categories including security/infrastructure information, personally identifiable information (PII), financial information, payment card industry information (PCI), proprietary data (IP), protected health information (PHI), and customer restricted sensitive data categories. Using table risk configuration user interface element 703, an operator can enable or disable the appropriate data categories for the currently selected database table. In the example shown, the operator has disabled every category except personally identifiable information (PII). In some embodiments, in order to disable a category, an operator is required to provide an explanation. The logged explanation provides a record of when potentially sensitive information is to be treated as not sensitive.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
analyzing database tables accessible by a computing instance environment to determine whether each of the database tables includes data belonging to one or more sensitive data categories;
determining an instance environment data risk metric that quantifies an aggregate data risk for the computing instance environment based at least in part on a combined result of a plurality of table risk metrics, wherein each of the plurality of table risk metrics corresponds to a different database table of the analyzed database tables, wherein each of the plurality of table risk metrics is based on whether the corresponding database table includes sensitive contents of data belonging to the one or more sensitive data categories;
receiving a request for a data operation, wherein the data operation is associated with a role of plurality of configured roles, wherein each role of the plurality of configured roles is assigned a permission to perform a corresponding one type of data operation, wherein each of one or more user groups associated with the computing instance environment is assigned one or more of the plurality of configured roles; and
modifying access to the data operation based on the determined instance environment data risk metric, wherein modifying the access includes invoking a responsive computer action for blocking the access to the data operation when the instance environment data risk metric exceeds a threshold.

2. The method of claim 1, wherein determining the instance environment data risk metric for the computing instance environment is further based at least in part on a plurality of configured data risk access weights.

3. The method of claim 2, wherein the plurality of configured data risk access weights includes a create data risk access weight, a read data risk access weight, an update data risk access weight, and a delete data risk access weight.

4. The method of claim 2, wherein different sets of weights of the plurality of configured data risk access weights are provided for each of the one or more sensitive data categories determined to belong to the computing instance environment.

5. The method of claim 1, wherein a plurality of data access operations is associated with each of the one or more sensitive data categories determined to belong to the computing instance environment.

6. The method of claim 5, wherein the plurality of data access operations includes a create data access operation, a read data access operation, an update data access operation, and a delete data access operation.

7. The method of claim 5, wherein each of the plurality of data access operations is associated with a configured data risk access weight.

8. The method of claim 1, wherein the combined result of the plurality of table risk metrics is determined by summing the plurality of table risk metrics.

9. The method of claim 1, wherein at least one of the plurality of table risk metrics is based on applying data risk access weights, and wherein the each of the applied data risk access weights is associated with a different data access operation for the database tables accessible by the computing instance environment.

10. The method of claim 9, wherein the data risk access weights include a create data risk access weight, a read data risk access weight, an update data risk access weight, and a delete data risk access weight.

11. The method of claim 9, wherein the different data access operation is a create data access operation, a read data access operation, an update data access operation, or a delete data access operation.

12. The method of claim 1, further comprising determining a category data risk metric of the computing instance environment for each of the one or more sensitive data categories determined to belong to the computing instance environment.

13. The method of claim 12, wherein the determined category data risk metric is based on applying data risk access weights, and wherein each of the applied data risk access weights is associated with a different data access operation for the database tables accessible by the computing instance environment.

14. The method of claim 13, wherein the data risk access weights include a create data risk access weight, a read data risk access weight, an update data risk access weight, and a delete data risk access weight.

15. The method of claim 13, wherein the different data access operation is a create data access operation, a read data access operation, an update data access operation, or a delete data access operation.

16. The method of claim 1, wherein the instance environment data risk metric for the computing instance environment is determined based at least in part on a count of a number of users with access to the data belonging to the one or more sensitive data categories.

17. A system, comprising:
one or more processors; and
a memory coupled to the one or more processors, wherein the memory is configured to provide the one or more processors with instructions which when executed cause the one or more processors to:
analyze database tables accessible by a computing instance environment to determine whether each of the database tables includes data belonging to one or more sensitive data categories;
determine an instance environment data risk metric that quantifies an aggregate data risk for the computing instance environment based at least in part on a combined result of a plurality of table risk metrics, wherein each of the plurality of table risk metrics corresponds to a different database table of the analyzed database tables, wherein each of the plurality of table risk metrics is based on whether the corresponding database table includes sensitive contents of data belonging to the one or more sensitive data categories;
receive a request for a data operation, wherein the data operation is associated with a role of plurality of configured roles, wherein each role of the plurality of configured roles is assigned a permission to perform a corresponding one type of data operation, wherein each of one or more user groups associated with the computing instance environment is assigned one or more of the plurality of configured roles; and
modify access to the data operation based on the determined instance environment data risk metric, wherein modifying the access includes invoking a responsive computer action for blocking the access to the data operation when the instance environment data risk metric exceeds a threshold.

18. The system of claim 17, wherein the determined instance environment data risk metric for the computing instance environment is further based at least in part on a plurality of configured data risk access weights, and wherein the plurality of configured data risk access weights includes a create data risk access weight, a read data risk access weight, an update data risk access weight, and a delete data risk access weight.

19. A computer program product, the computer program product being embodied in a non-transitory computer readable storage medium and comprising computer instructions for:

analyzing database tables accessible by a computing instance environment to determine whether each of the database tables includes data belonging to one or more sensitive data categories;

determining an instance environment data risk metric that quantifies an aggregate data risk for the computing instance environment based at least in part on a combined result of a plurality of table risk metrics, wherein each of the plurality of table risk metrics corresponds to a different database table of the analyzed database tables, wherein each of the plurality of table risk metrics is based on whether the corresponding database table includes sensitive contents of data belonging to the one or more sensitive data categories;

receiving a request for a data operation, wherein the data operation is associated with a role of plurality of configured roles, wherein each role of the plurality of configured roles is assigned a permission to perform a corresponding one type of data operation, wherein each of one or more user groups associated with the computing instance environment is assigned one or more of the plurality of configured roles; and modifying access to the data operation based on the determined instance environment data risk metric, wherein modifying the access includes invoking a responsive computer action for blocking the access to the data operation when the instance environment data risk metric exceeds a threshold.

\* \* \* \* \*